United States Patent [19]

Nolley, Jr.

[11] 4,110,087
[45] Aug. 29, 1978

[54] SULFUR DIOXIDE REMOVAL BY ABSORPTION AND FRACTIONATION

[75] Inventor: John P. Nolley, Jr., Glendale Heights, Ill.

[73] Assignee: UOP Inc., Des Plaines, Ill.

[21] Appl. No.: 832,486

[22] Filed: Sep. 12, 1977

Related U.S. Application Data

[63] Continuation-in-part of Ser. No. 738,407, Nov. 2, 1976, abandoned.

[51] Int. Cl.² .................... F25J 3/08; B01D 53/14; B01D 3/14
[52] U.S. Cl. .................................. 55/73; 55/89; 62/17; 62/24; 203/12; 203/39; 203/74; 203/75; 203/87; 203/DIG. 19; 423/244; 423/539
[58] Field of Search ............... 203/39, 42, 74, 81, 203/75, 82, 87, 99, DIG. 19, 41, 10–12; 423/244, 230, 437, 539; 55/73, 33; 62/26, 24, 17

[56] References Cited

U.S. PATENT DOCUMENTS

| | | | |
|---|---|---|---|
| 1,341,114 | 5/1920 | Eustis | 203/87 |
| 3,293,154 | 12/1966 | Newton | 203/DIG. 19 |
| 3,553,936 | 1/1971 | Little et al. | 55/73 |
| 3,575,007 | 4/1971 | Gunther | 62/26 |
| 3,733,779 | 5/1973 | Bellisio et al. | 55/73 |
| 3,764,665 | 10/1973 | Groenendaal et al. | 423/539 |
| 3,767,777 | 10/1973 | Frye et al. | 423/539 |
| 3,832,445 | 8/1974 | Kouwenhoven et al. | 423/244 |
| 3,959,451 | 5/1976 | Henderson et al. | 423/539 |
| 3,985,529 | 12/1976 | Petersson | 55/73 |

*Primary Examiner*—Wilbur L. Bascomb, Jr.
*Attorney, Agent, or Firm*—James R. Hoatson, Jr.; John F. Spears, Jr.; William H. Page, II

[57] ABSTRACT

Anhydrous liquid sulfur dioxide is recovered from environmentally unsuitable vapor or liquid streams comprising water, sulfur dioxide and carbon dioxide. The vapor streams are fed into an absorption zone and contacted with a lean liquid water stream. A resulting sulfur dioxide rich water stream is passed into a first fractionation column utilized in part as the stripper column which produces the lean water stream. A sidecut stream removed above the feed point is passed into a second fractionation column, and the overhead vapor of the first column is subjected to two stages of partial condensation to aid carbon dioxide rejection. Anhydrous sulfur dioxide is removed as a liquid sidecut of the second column, and the net overhead vapor of the second column is preferably passed into the overhead system of the first column after a partial condensation.

10 Claims, 3 Drawing Figures

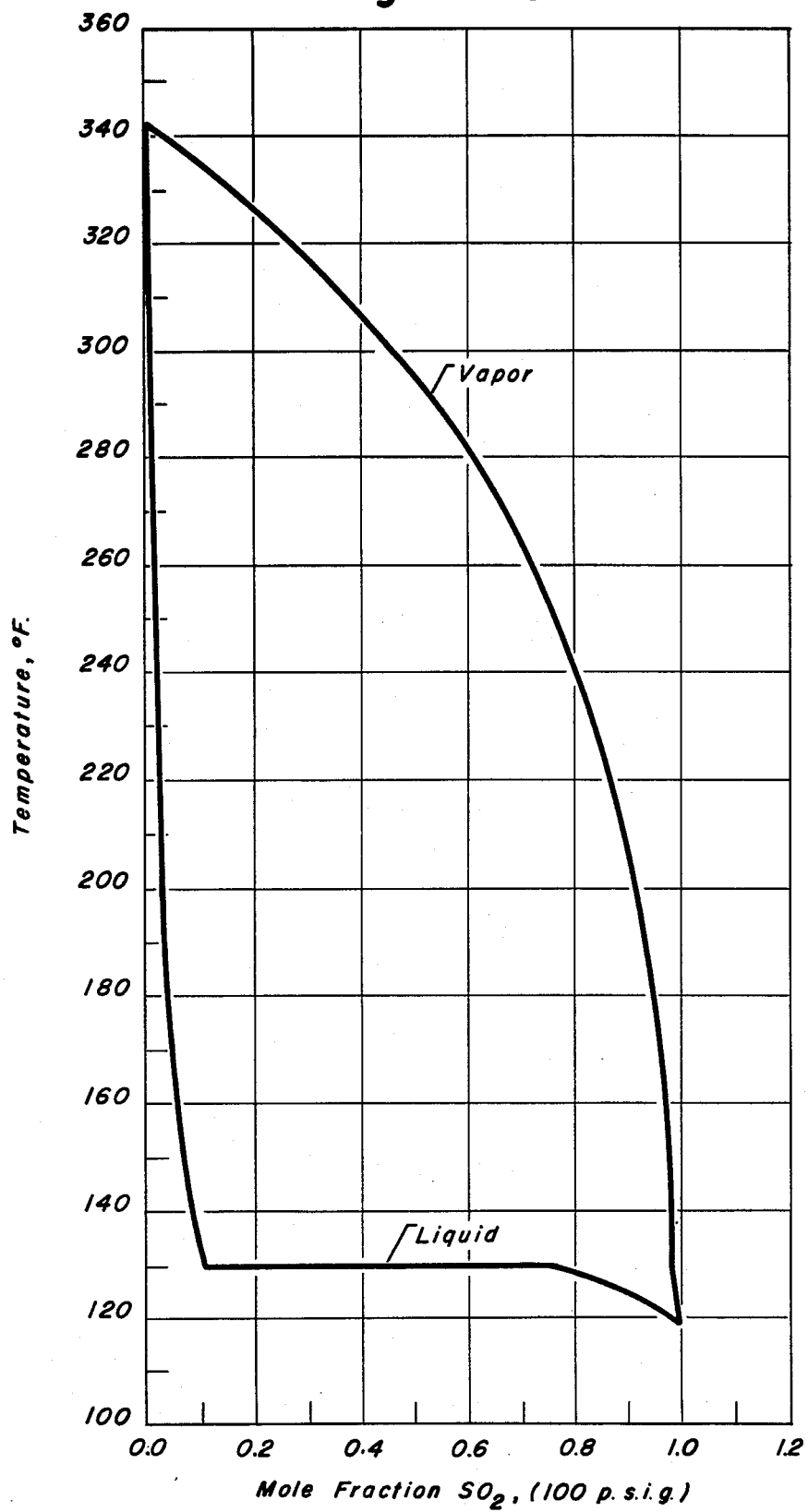

SULFUR DIOXIDE REMOVAL BY ABSORPTION AND FRACTIONATION

CROSS-REFERENCE TO RELATED APPLICATION

This application is a continuation-in-part of my prior application Ser. No. 738,407 filed Nov. 2, 1976, and now abandoned the teachines of which are specifically incorporated herein by reference.

FIELD OF THE INVENTION

The invention generally relates to the broad field of pollution control concerned with the removal of sulfur dioxide from vapor or water streams. The invention also relates to a process for the production of anhydrous sulfur dioxide by the fractionation of a liquid water stream containing dissolved sulfur dioxide and carbon dioxide. The invention also finds application in the recovery or removal of sulfur dioxide from industrial gas streams, such as power plant flue gas streams, and to the removal of sulfur dioxide from water streams. The invention may be applied in processes for the removal of sulfur oxides from gas streams through the use of regenerable metal oxide acceptors.

PRIOR ART

Sulfur dioxide is a basic industrial chemical, and it is well described in the literature. An extensive description of its properties and its manufacture are contained in volume 13 of the *Encyclopedia of Chemical Technology*, published by the Interscience Encyclopedia, Inc., New York, New York, 1954. This reference indicates liquid sulfur dioxide has been produced from both the burning of sulfur and from waste gases, as from smelters or phenol production. In the most common method cooled sulfur burner gas is passed through a packed absorption column countercurrent to a liquid water stream. The resultant sulfur dioxide-rich water contains about 1-2% $SO_2$ and is stripped by heating with low pressure steam. The gaseous mixture of sulfur dioxide and water vapor leaving the stripper is then dried with sulfuric acid and finally dried and compressed. This same reference indicates liquid sulfur dioxide has been manufactured without the use of an absorption operation by flash roasting nickel ore using pure oxygen followed by the direct compression of the resultant gases.

The production of liquid sulfur dioxide is also described in Vol. 42, No. 11 of *Industrial and Engineering Chemistry*, November, 1950 at page 2253. The $SO_2$ is recovered as a vapor with a dimethylaniline solution and then stripped from this solution. The $SO_2$ vapor is then bubbled through water to recover the dimethylaniline in a rectification zone. Finally the overhead vapor of this zone is dried by countercurrent contacting with concentrated sulfuric acid. U.S. Pat. No. 3,959,451 also shows this.

The industrial importance of mixtures of sulfur dioxide and water has prompted a considerable interest in the thermodynamic properties of this system. The available data is, however, concentrated in an area of relatively low temperatures and high water concentrations and does not provide complete guidance in the design of sulfur dioxide fractionation columns. This may be due to the apparent disagreement as to the true nature of the $SO_2$-$H_2O$ phase equilibrium system which exists in the literature. For instance, a text by J. S. Rowlinson, *Liquids and Liquid Mixtures*, Plenum Press, N.Y., N.Y., 2nd Edition, 1969 [Library of Congress C.C. No. 70-7522] states on Page 204 that the system is azeotropic. But on page 13 of *Azeotropic Data-III*, Lee H. Horsely (ed), it is stated that the system is non-azeotropic citing a Belgian reference Lecat, *Azeotropism*, Lamertin, Brussels, 1918. This reference, however, was found not to mention the $SO_2$-$H_2O$ system. A relatively complete investigation of the system is described in the article, "Phase Equilibria in the System $SO_2$-$H_2O$ from 25°-300° C." B. C. Spall which appeared in the April, 1963 Edition of *The Canadian Journal of Chemical Engineers* at pages 79-83. This article presents phase equilibrium data and lists other references. The article also affirms that in the temperature and concentration ranges desired for fractionation the sulfur dioxide-water system is nonideal. That is, there is a region in which two liquid phases of different compositions coexist with a vapor phase having an invariant composition. The literature also describes sulfur dioxide as being only slightly miscible with water. From this it is believed that the general opinion of those skilled in the art has been that the sulfur dioxide-water system is a heterogeneous azeotrope. These are believed to be the reasons why the prior art has concentrated on removing and purifying sulfur dioxide by methods other than facile fractionation process described herein.

In the Edeleanu process of treating petroleum fractions for the removal of aromatics and olefins by sulfur dioxide extraction it was necessary to maintain the circulating sulfur dioxide in a relatively anhydrous form to limit corrosion. Among the methods developed to dry the sulfur dioxide was that described in U.S. Pat. No. 1,917,736 (Cl. 208-321) and in an article appearing at pages 538-542 of the June, 1948 Edition of *Petroleum Processing*. This method is indicated as drying the sulfur dioxide by passing a relatively dry water-sulfur dioxide mixture into a fractionation column which is refluxed with liquid sulfur dioxide. However, while indicating the overhead $SO_2$ stream contains 0.03 wt.% water, neither reference entirely describes the precise manner of operation or the composition of the drawn-off water. However, the article does specify that "water" collects in a reboiler which is held at a temperature sufficiently low to minimize vaporization of water and that some $SO_2$ remains dissolved in the water. This implies that the method taught in these two references consists of operation only along one portion of the $SO_2$-$H_2O$ phase diagram and not a true fractionation down to two pure components. That is, the relatively dry $SO_2$ fed to the column was further dried by a rectification operation which produced one or both of the liquid phases which comprise both $SO_2$ and $H_2O$ in the bottom of the column, and water was therefore removed by the decantation of this impure liquid. The conditions specified in the article support this. These conditions are a pressure of 80 psig. and a bottom temperature of 190° F. The boiling point of water at 80 psig. is 324° F. This indicates the liquid in the bottom of the column must contain several percent of $SO_2$. In the subject invention the bottoms temperature of the column is closed to the boiling point of water at the pressure imposed and the bottoms product is not a two phase liquid but very pure water. The subject method therefore differs from the prior art in both the conditions used and the purity of the products formed. It also differs in using the dry overhead vapors to form the reflux material.

It is known that SO$_2$ can be stripped from a water stream. This is performed in the previously described SO$_2$ production process. U.S. Pat. No. 3,575,007 (Cl. 62–26) describes the steam stripping of a water steam containing 0.006 mole fraction of SO$_2$. The products are a water stream and an overhead vapor stream containing 87 percent by volume SO$_2$ and 13 percent water. This reference differs from the subject process in that it only presents a stripping operation in which SO$_2$ is driven out of the water and in that the overhead vapor is not anhydrous. That is, the overhead vapors must contain the steam used for stripping in the uppermost stage. Furthermore, it is specified that the conditions present in the bottom of the stripping column are a pressure of 34 mm. Hg and a temperature of 40° F. (4° C.). At this pressure the boiling point of water is about 86° F. (31° C.). This reference therefore also operates well below the boiling point of pure water at the pressure imposed.

Another process in which sulfur dioxide is stripped from a water stream is presented in U.S. Pat. No. 3,985,529 (Cl. 62–17). In this process an aqueous liquid stream containing dissolved sulfur dioxide is fed to the top of a stripping column along with a liquid stream which is predominantly water. This process, therefore, does not produce an anhydrous sulfur dioxide stream which is removed from the stripper. Also, the process as described appears not to include the retention of a liquid sulfur dioxide phase upon the fractionation trays of the stripping column.

The environmental reasons for removing sulfur dioxide from industrial off-gases, such as power plant flue gas or smelter off-gases, have resulted in a stiffening of emission regulations. These have in turn prompted the improvement and development of various systems for purifying these industrial off-gases. Several of these systems concentrate the sulfur dioxide into an effluent gas stream which is then charged to a sulfur recovery zone such as a Claus unit. The preferred system for this operation is known as the Shell Flue Gas Desulfurization process and has been described in various references. In this system sulfur oxides are removed from gas mixtures at elevated temperatures with solid acceptors for the sulfur oxides. The acceptors are then regenerated by contact with a reducing gas such as hydrogen. This is described in detail in U.S. Pat. Nos. 3,832,445 (Cl. 423–244) and 3,892,677 (Cl. 252–411S). The control of this system is described in U.S. Pat. No. 3,692,480 (Cl. 423–239).

U.S. Pat. No. 3,764,665 (Cl. 423–574) illustrates the prior art arrangement for utilization of the Shell Flue Gas Desulfurization process. The upstream flow depicted in FIG. 1 may be used with the subject process.

BRIEF SUMMARY OF THE INVENTION

The invention provides a process for recovering anhydrous sulfur dioxide from gaseous or aqueous feed streams which also contain carbon dioxide. One embodiment of the invention may be characterized as a process for removing sulfur dioxide from a water stream comprising carbon dioxide which comprises the steps of passing the water stream into a first intermediate point of a trayed first fractionation column operated at conditions which include a bottoms temperature near the boiling point of water at the pressure imposed within the first column and the retention of liquid phase sulfur dioxide on fractionation trays located above the first intermediate point; removing a high purity water stream as the net bottoms product of the first column; removing a liquid sidecut stream comprising sulfur dioxide from the first column at a second and higher intermediate point; partially condensing an overhead vapor stream comprising sulfur dioxide and carbon dioxide which is withdrawn from the first column to form a first condensate and a first vapor stream; admixing the first vapor stream with a second vapor stream and partially condensing the resultant admixture to form a third vapor comprising carbon dioxide and sulfur dioxide and a second condensate stream; passing the first and the second condensate streams into the first column as reflux liquid; passing the first liquid sidecut stream into a first intermediate point of a second fractionation column operated at conditions effective to separate sulfur dioxide and water by fractionation; removing a second liquid sidecut stream comprising anhydrous sulfur dioxide from the second column at a second and higher intermediate point; passing the net bottoms product stream of the second column comprising water and sulfur dioxide into the first column; and partially condensing the overhead vapor stream of the second column to form reflux liquid and a vapor stream which is admixed with the first vapor stream as the previously referred to second vapor stream.

DESCRIPTION OF THE DRAWING

FIG. 3 is a diagram of SO$_2$-H$_2$O vapor-liquid equilibrium compositions versus temperature.

FIG. 1 illustrates the preferred embodiment of the invention as used to recover anhydrous liquid sulfur dioxide from a gas stream comprising both sulfur dioxide and carbon dioxide and possibly other gases such as nitrogen. For clarity and simplicity various subsystems and apparatus associated with the operation of the process have not been shown. These items include flow and pressure control valves, pumps, temperature and pressure monitoring systems, fractionator internals, etc., which may be of customary design. This representation of the preferred embodiment is not intended to preclude from the scope of the inventive concept those other embodiments set out herein or which are the result of reasonable and normal modification of these embodiments.

Figure 1:
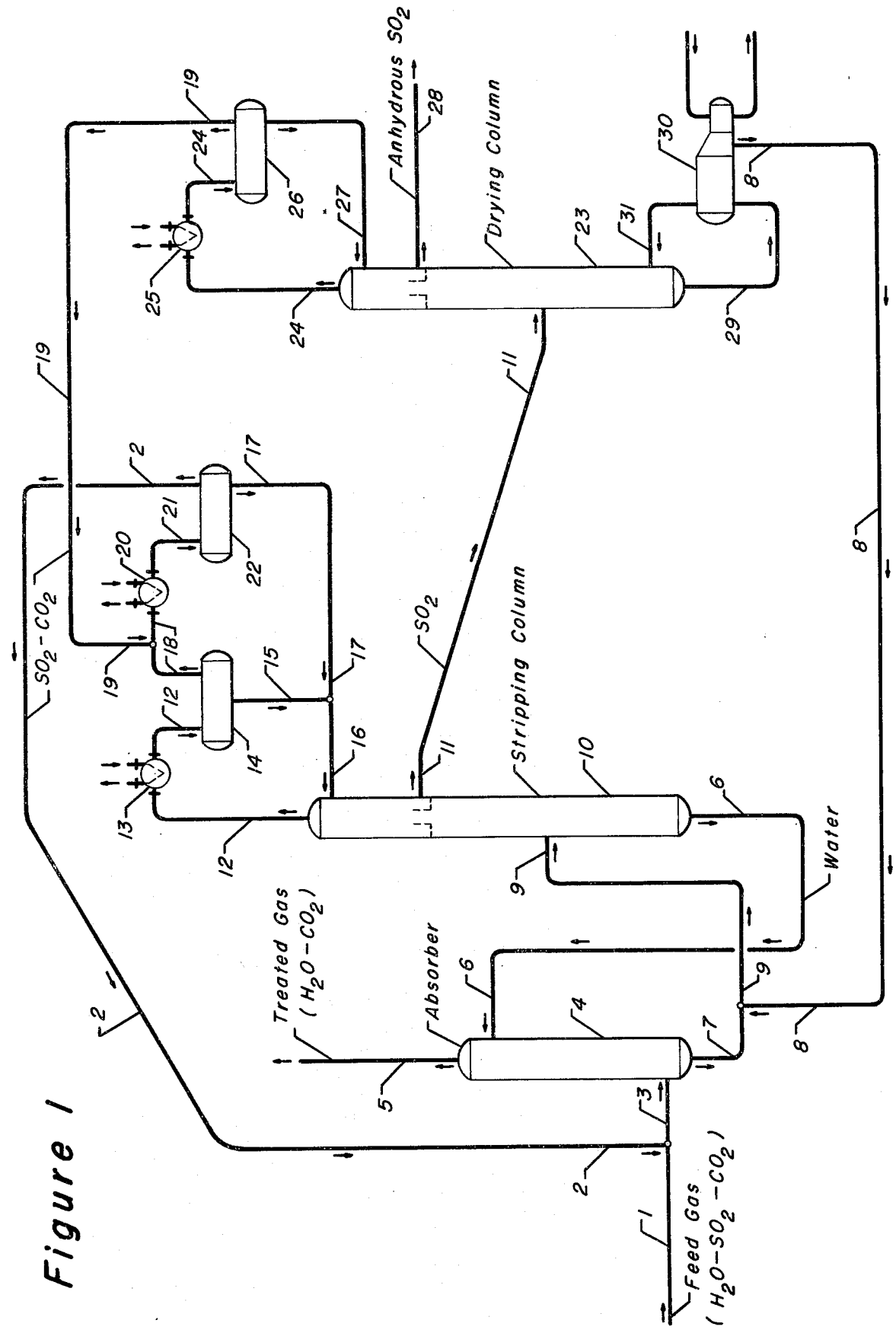
FIG. 1 is a schematic flow diagram of the preferred embodiment of the invention.

Referring now to the Drawing, a feed gas stream comprising sulfur dioxide, carbon dioxide, water and possibly other gases, such as hydrogen and nitrogen, enters the process through line 1. It is admixed with a vapor stream comprising sulfur dioxide and carbon dioxide from line 2 and passed into the bottom of a trayed absorber 4 via line 3. The gases rise countercurrent to an aqueous lean absorbent stream which enters the absorber in line 6. Sizable amounts of sulfur dioxide are transferred to the absorbent stream and some carbon dioxide is also absorbed. The remaining gases leave the absorber in line 5. A resultant sulfur dioxide-rich absorbent liquid is removed in line 7. The rich absorbent stream is admixed with water from line 8 and passed into a stripping column 10 through line 9 at a first intermediate point.

The stripping or first fractionation column has both a lower stripping section and an upper rectification section. These sections are respectively located below and above the feedpoint. This column is maintained at conditions effective to separate sulfur dioxide and water. The stripping within the lower section of the column removes sulfur dioxide and carbon dioxide from the liquid entering in line 9 to form a lean absorbent stream removed as a bottoms product in line 6. This absorbent stream may be relatively sulfur dioxide free water. Accumulated water may be withdrawn from the process at this point through a line not shown. A liquid sidecut stream comprising liquid sulfur dioxide and water is removed in line 11 at a second and higher intermediate point and passed into a drying column 23 at a first intermediate point.

An overhead vapor stream comprising sulfur dioxide and carbon dioxide is removed from the first column in line 12 and partially condensed in cooler 13. The resultant condensate contains liquid phase sulfur dioxide, and the remaining vapor phase comprises sulfur dioxide and carbon dioxide. These two phases are separated in the overhead receiver 14, and the vapor phase is removed in line 18. A vapor stream from line 19 which also comprises sulfur dioxide and carbon dioxide is admixed into the vapor phase, and the commingled vapors passed through a second cooler 20 via line 21. A second partial condensation in the second cooler produces a second liquid phase comprising liquid phase sulfur dioxide and a residual vapor. The two phases are separated in a second overhead receiver 22. The condensate is then removed in line 17 and admixed with the condensate removed from the first overhead receiver in line 15. The resultant total condensate stream is passed into the top of the column as reflux through line 16. The residual vapor comprises sulfur dioxide and carbon dioxide and is recirculated to the absorber via line 2.

The liquid sidecut stream fed to the second or drying column 23 is also subjected to conditions effective to separate sulfur dioxide and water by fractionation. A bottoms stream, which may be water containing dissolved sulfur dioxide, is removed in line 29 and passed into a reboiler 30. Vapors formed in the reboiler enter the bottom of the column through line 31, and a bottoms stream is removed in line 8. A product stream comprising liquid phase anhydrous sulfur dioxide is removed at second and higher intermediate point in line 28. An overhead vapor stream comprising sulfur dioxide and carbon dioxide is removed from the second column in line 24 and partially condensed in a cooler 25. The resultant liquid and vapor are passed into an overhead receiver 26 and separated. The liquid is passed into the top of the second column as reflux. The vapor, which comprises both sulfur dioxide and carbon dioxide, is removed in line 19 and is preferably injected into the overhead system of the first column as shown.

DETAILED DESCRIPTION

A great many industrial processes are facing increasingly stringent standards for the amount of sulfur dioxide or other sulfur oxides which they may discharge. These standards apply to both aqueous streams and to gaseous streams. A listing of the industries affected by this includes, but is not limited to non-nuclear electric power plants, smelters and other facilities for refining metal ores, steel mills, petroleum refining operations, and the chemical industries including plants for the manufacture of sulfuric acid and other sulfur-containing chemicals. The problem of sulfur removal and disposal will also occur in commercial scale coal liquefaction and coal gasification operations, in oil-shale plants and in other industrial processes. To cope with this problem a large number of processes have been developed for the removal of sulfur dioxide for both gaseous and aqueous streams. Some of these processes produce elemental sulfur directly as a product. Others however function mainly by removing and concentrating the sulfur dioxide in a form suitable for the production of sulfur. In many of these applications the sulfur dioxide will be admixed with carbon dioxide. For instance, both substances are formed in the combustion of high sulfur content coal.

In some pollution control processes elemental sulfur is produced by means of a Claus process unit. In the Claus process sulfur is formed from sulfur dioxide and hydrogen sulfide, at least partly in the presence of a catalyst. These sulfur-producing processes are not without their problems. One of these is that the effluent gas of the Claus unit is not totally free of sulfur compounds and in itself presents an environmental problem. A Claus unit is also a major capital investment and requires continual expenditures for maintenance and operation. For these reasons it is not desirable in some cases to utilize a process for the removal of sulfur dioxide from gaseous or aqueous streams which requires the conversion of the sulfur dioxide to elemental sulfur through the use of a Claus unit. As a second consideration, the sulfur dioxide which is being removed from these effluent streams often has a higher price per ton than sulfur. This cost differential becomes more significant when it is realized that a large fraction of the weight of the sulfur dioxide is in the form of oxygen which has been obtained simply by burning sulfur.

A number of industrial processes utilize sulfur dioxide and in some instances it may be desired to recover or purify the sulfur dioxide to allow it to be recycled. It may also be necessary to separate and dry sulfur dioxide during its manufacture.

It is therefore an objective of the present invention to provide a process for the removal of sulfur dioxide from vapor streams and from aqueous streams. It is another objective of the present invention to provide a method of removing sulfur dioxide from aqueous steams and from vapor streams containing carbon dioxide and of producing anhydrous liquid sulfur dioxide as a product. It is yet another objective of this invention to provide a process for the removal of sulfur dioxide from an aqueous stream containing carbon dioxide which effects a substantially total removal of sulfur dioxide from the aqueous stream.

The differing embodiments of the invention result in part from its ability to remove sulfur dioxide from both gaseous and aqueous streams, and also because of the variation which is possible in the upstream units used to prepare the sulfur dioxide-containing stream which is charged into the absorption zone. These upstream units may comprise a process referred to as the Shell Flue Gas Desulfurization process. This process is described in U.S. Pat. Nos. 3,832,445 and 3,892, 677. The process has two basic phases, acceptance in which sulfur oxide reacts with a solid acceptor, and regeneration, wherein the spent acceptor is prepared for reuse in the acceptance step. The acceptance step is effected by contacting an $SO_2$ and oxygen-containing gas with the acceptor. The term $SO_2$ and oxygen-containing gas means any gas containing sulfur dioxide in air polluting quantities and also containing sufficient oxygen to stoichiometrically combine the sulfur dioxide and a metal oxide to form a metal sulfate upon contact with a solid acceptor. Examples of such gases include the flue gas of a coal fired heated and Claus plant off-gas after incineration. Preferably, the acceptor comprises copper oxide supported on a carrier material which is resistant to high temperatures and which is not attacked by sulfur dioxide and other components found in the gas stream to be treated. These carriers are referred to in this context as inert carriers. Suitable examples of these carriers are natural clays which may or may not be acid pretreated, bauxite, alumina, boria, silica, silica-alumina, etc. Preferred carriers have a relatively large specific surface area for maximum contact area and high loading of the acceptor. The surface area should be at least 10 m$^2$/g and preferably at least 100 m$^2$/g.

The use of other metals on acceptors is known in the art, and the inventive concept disclosed herein may be applied to any of these other metals. However, it is preferred that a copper-containing acceptor is used as this allows the acceptance and regeneration phases to occur at substantially the same temperature range. This provides a simpler system which is not subjected to stresses due to thermal cycling. The copper content of the acceptor may vary within wide limits. It is preferred to have at least 1 wt.%, preferably from 5 to 15 wt.%, of copper calculated on the basis of total acceptor composition. Further details on the acceptor may be obtained by reference to U.S. Pat. Nos. 3,770,647 and 3,776,854.

The SO$_2$-containing gas is contacted with the acceptor by passing the gas through fixed, moving or fluidized beds of accepted particles. Preferably the gas passes between parallel beds of pelletized acceptor material which are retained by woven wire screens. The apparatus used for this may be constructed in the manner indicated in U.S. Pat. Nos. 3,501,897; 3,707,831 and 3,747,308. The acceptance phase proceeds under oxidative conditions in the presence of oxygen at temperatures between 300° C. and 500° C., preferably between 325°–425° C. Operation outside of these ranges is not desirable.

Regeneration of the acceptor is effected in the presence of a reducing gas at a temperature at or only slightly above the acceptance temperature. The preferred temperature range will vary with the reducing gas and the composition of the acceptor. Temperatures of from about 200° to 500° C. may be used, but the temperature is preferably kept between 350° and 450° C. At these temperatures and in the presence of a reducing gas, copper sulfate releases the bulk of the accepted sulfur as sulfur dioxide to provide a concentrated stream of sulfur dioxide. This concentrated stream of SO$_2$ may be further processed to remove SO$_2$ in ways which are not feasible with the relatively dilute gas streams passed through the process during the acceptance phase. For instance, it may be used as the precursor of the feed gas stream fed to the preferred embodiment of the subject process. Suitable reducing gas for the regeneration phase include hydrogen or hydrogen/carbon monoxide mixtures and various C$_1$–C$_3$ hydrocarbons. Further details on the regeneration procedure are available in U.S. Pat. Nos. 3,832,445 and 3,892,677.

At the core of the invention is the discovery that aqueous mixtures containing dissolved sulfur dioxide and carbon dioxide can be fractionated to produce high purity water and anhydrous sulfur dioxide. That is, a typical waste water stream containing carbon dioxide and sulfur dioxide can be separated into an overhead product of anhydrous liquid sulfur dioxide and a bottoms product of essentially pure water. As used herein the term "anhydrous sulfur dioxide" is used to refer to a liquid containing at least 99.8 mole percent sulfur dioxide. Although the sulfur dioxide-water system is somewhat atypical in its thermodynamics, the system is similar to many commonly fractionated materials in that the purity of the overhead and bottom product streams is limited only by the degree to which they are fractionated. That is, any desired purity may be obtained with a sufficient number of trays and adequate reflux. The anhydrous sulfur dioxide produced overhead may therefore be 99.98 mole percent sulfur dioxide or of greater purity.

FIG. 3 illustrates equilibrium vapor and liquid compositions of the SO$_2$-H$_2$O system at various temperatures at 100 psig. From this it may be seen that as the temperature at the bottom of a fractionation column used in the subject process approaches the boiling point of water, the liquid in the bottom of the column will contain less and less sulfur dioxide. To assure a low concentration of sulfur dioxide the bottom liquid in the first fractionation zone should be maintained at a temperature which is within 20 Fahrenheit degrees of the boiling point of pure water at the pressure imposed at the bottom of the fractionation zone. Preferably, the bottoms temperature is maintained at or within 10 and more preferably within 5 Fahrenheit degrees of the boiling point of water. The pressure imposed in the columns may vary broadly from subatmospheric to about 1500 psig. However, it is preferred that a pressure of from 20 to about 250 psig., as measured at the top of each column, be employed. The apparatus used for the fractionation may be any of the customary types which is suitable for the SO$_2$-H$_2$O system. The apparatus may be selected, designed, and properly sized by those skilled in the art. Preferably the columns contain sieve or valve trays on about 24-inch spacing.

The fractionation column in which the raw water stream or rich absorbent liquid from the absorber is charged has both a rectification and a stripping section. These sections are those portions of the column located above and below the feed point respectively. The water therefore enters the column at an intermediate point. As used herein the term intermediate point is intended to refer to a point in the column which is spearated from each extremity of the column by a distance containing a sufficient number of trays or amount of packing to act as two theoretical contact stages or trays, and preferably three theoretical trays.

Those skilled in the art will recognize that the operations to be performed in the stripping and drying columns, that is the first and second columns, could also be performed using two or more fractionation columns. For instance, the raw water could be fed to the top of the column used as a conventional SO$_2$ stripping column and the overhead vapor of this column fed into the bottom of another column. The use of singular fractionation columns rather than fractionation zones is preferred.

Figure 2:
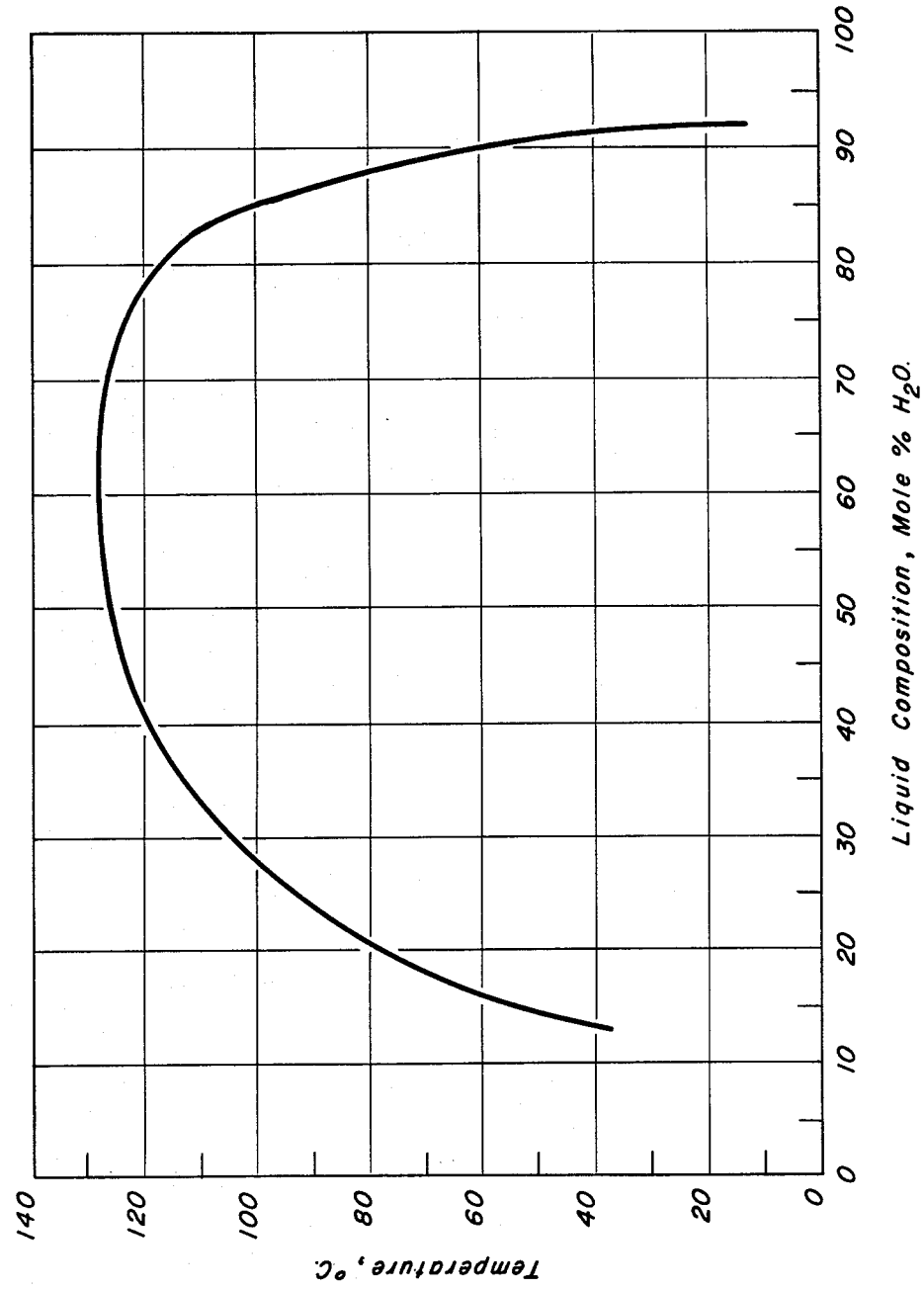
FIG. 2 is a diagram of the previously referred to experimental data derived by B. C. Spall and which shows the two-phase composition of sulfur dioxide-water mixtures at various temperatures.

FIG. 2 illustrates the nonideal character of the SO$_2$-H$_2$O system. It indicates that two liquid phases of different compositions may form the liquid which is present in some portions of the fractionation columns. These two phases will both be present on some of the trays in the rectification section of the column. FIG. 3 indicates another strange phenomenon will occur in the column. This is the invariant boiling point of the liquid as the concentration of sulfur dioxide in the liquid increases and moves along the horizontal line at the bottom of the Figure. At the same time, the coexisting vapor will have a relatively high sulfur dioxide concentration which is above that found in the liquid. It is because the concentration of sulfur dioxide is higher in the vapor phase than in either liquid phase that the system may be fractionated to complete purity. Because the system can be so fractionated, it is not a heterogeneous azeotrope. The constant boiling point of the changing liquid may even result in the liquid temperature on several fractionation trays being the same while the liquid is being fractionated.

The subject process also differs from the prior art $SO_2$ stripping operations in that liquid phase sulfur dioxide is retained upon fractionation trays used in the rectification section of the first and second columns. In the first column this sulfur dioxide may have some sizable amount of water dissolved in it, but in the second column there should be present substantially anhydrous liquid sulfur dioxide. At the same time, relatively sulfur dioxide-free water will be retained on trays of the first and possibly the second fractionation column.

The subject process can be applied to the removal of sulfur dioxide from either liquid or gaseous feed streams. The recovery of the sulfur dioxide also results in the purification of the feed streams. Normally the sulfur dioxide concentration in a waste water stream is rather low, and it is preferably kept below 10 mole percent in the subject process. Such waste water streams can be charged directly to the first fractionation column for purification. In this instance the resultant purified water is removed as a net bottoms product of the first column. If the feed stream is gaseous, it is preferably first contacted with water to saturate it with water and is then scrubbed in the absorption zone to transfer the sulfur dioxide to a water stream. Both of these steps may be perfomed by the passage of the water and gas stream through a packed bed of suitable size, for instance a 10-foot long bed of 1½-inch porcelain Intalox saddles. Trayed columns may also be used and are preferred for use in the absorption zone. The sulfur dioxide-rich water stream produced in the absorption zone is then charged to the first fractionation column for recovery of the sulfur dioxide. The removal of sulfur dioxide from a vapor stream is performed in the preferred embodiment of the invention.

The conditions used in the absorption zone may be selected by those skilled in the art. Preferred are pressures of from about 1.0 psig. to 500 psig. and temperatures of from about 40° F. to about 250° F. or higher. The purified water produced in the bottom portion of the first fractionation column is preferably supplied to the top of absorption zone to function as the lean absorber liquid. More than one stream of water may be withdrawn from the fractionation column for use as an absorber liquid. For instance, if the absorption zone is operated with countercurrent vapor and liquid flows, a fractionation column sidecut removed below the feed point may enter an intermediate point of the absorption zone and a stream of fractionation column bottoms may enter the top of the absorption zone.

The subject process is performed using feed streams which contain carbon dioxide. This normally gaseous compound circulates through the two fractionation columns and is therefore found in the overhead system of the two columns. Its ultimate rejection is aided by the partial condensation of the overhead vapors of the two columns. For instance, the overhead vapor stream of the first column may be removed at a pressure of approximately 100 psig. and cooled to about 100° F. in the first condenser corresponding to cooler 13 of FIG. 1. The vapor remaining after this condensation step might contain about 30 mole percent carbon dioxide and would be cooled to about 50° F. to effect the second condensing step. The combined condensate formed in these two steps should contain about 2 percent carbon dioxide, with the remainder being sulfur dioxide. The vapor phase remaining after the second partial condensation will, under these exemplary conditions, contain about 73 mole percent carbon dioxide and 27 mole percent sulfur dioxide.

The liquid sidecut stream removed from the first column and passed into the second column preferably contains over 98 mole percent sulfur dioxide. The remainder of this stream should be mainly carbon dioxide and water. The amount of water in the side stream is dependent on the location at which the sidestream is removed and decreases as the amount of fractionation performed between the first and the second intermediate points of the first column increases. This water is removed at the bottom of the column. The carbon dioxide is rejected in the overhead vapors which remain after the partial condensation associated with the second column. This condensation step may be performed at a pressure of about 110 psig. and a temperature of 100° F. The gas remaining after this condensation step will have a composition similar to that of the vapor remaining after the first partial condensation of the overhead vapor of the first column. It is therefore preferably, but not necessarily, admixed with the residual vapor.

In accordance with this description, the preferred embodiment of the invention may be characterized as a process for removing sulfur dioxide from a gaseous feed stream comprising water, sulfur dioxide and carbon dioxide which comprises the steps of contacting the gaseous feed stream with a sulfur dioxide lean absorbent stream comprising water in an absorption zone operated at conditions effective to produce a sulfur dioxide rich absorbent stream comprising carbon dioxide and an off-gas stream containing less sulfur dioxide than the gaseous feed stream; passing the sulfur dioxide rich absorbent stream into a first intermediate point of a first fractionation zone having a rectification section and a stripping section and operated at conditions effective to cause the separation of water and sulfur dioxide by fractionation including (1) a bottom temperature within 20 Fahrenheit degrees of the boiling point of water at the pressure imposed at the bottom of the first fractionation zone, and (2) the retention of liquid sulfur dioxide on fractionation trays located above the first intermediate point and the retention of liquid water on fractionation trays located below the first intermediate point; passing at least a portion of a sulfur dioxide lean water stream removed as a bottoms product of the first fractionation column into the absorption zone as the sulfur dioxide lean absorbent stream; removing a first liquid sidecut stream comprising sulfur dioxide from the first fractionation zone at a second, higher intermediate point; partially condensing an overhead vapor stream comprising sulfur dioxide and carbon dioxide withdrawn from the first fractionation zone to form a first condensate stream comprising sulfur dioxide and a first vapor stream comprising carbon dioxide and sulfur dioxide; admixing the first vapor stream with a hereinafter described second vapor stream and partially condensing the resultant admixture to form a third vapor stream comprising sulfur dioxide and carbon dioxide and a second condensate stream comprising sulfur dioxide; passing the first and the second condensate streams into the first fractionation zone as reflux liquid; passing the third vapor stream into the absorption zone and contacting the third vapor stream with the sulfur dioxide lean absorbent stream; passing the first liquid sidecut stream into a first intermediate point of a second fractionation zone having a rectification section and a stripping section and operated at conditions effective to cause the separation of water and sulfur dioxide by fractionation; removing a second liquid sidecut stream comprising anhydrous sulfur dioxide from the second fractionation zone at a second, higher intermediate point; passing a bottoms liquid product stream comprising water and sulfur dioxide and removed as a bottoms product of the second fractionation zone into the first fractionation zone; partially condensing an overhead vapor stream comprising sulfur dioxide and carbon dioxide and removed from the second fractionation zone to form reflux liquid used in the second fractionation zone and a fourth vapor stream comprising sulfur dioxide and carbon dioxide; and admixing the fourth vapor stream with the first vapor stream as the previously specified second vapor stream. The removal of sulfur dioxide from an aqueous stream is a broader embodiment of the invention which may be characterized in similar terms with appropriate deletion of those operations associated with the absorption zone.

I claim as my invention:

1. A process for removing sulfur dioxide from a gaseous feed stream comprising water, sulfur dioxide and carbon dioxide which comprises the steps of:

(a) contacting the gaseous feed stream with a sulfur dioxide lean absorbent stream comprising water in an absorption zone operated at conditions effective to produce a sulfur dioxide rich absorbent stream comprising carbon dioxide and an off-gas stream containing less sulfur dioxide than the gaseous feed stream;

(b) passing the sulfur dioxide rich absorbent stream into a first intermediate point of a first fractionation column having a rectification section and a stripping section and operated at conditions effective to cause the separation of water and sulfur dioxide by fractionation including (1) a bottom temperature within 20 Fahrenheit degrees of the boiling point of water at the pressure imposed at the bottom of the first fractionation column, and (2) the retention of liquid sulfur dioxide on fractionation trays located above the first intermediate point and the retention of liquid water on fractionation trays located below the first intermediate point;

(c) passing at least a portion of a sulfur dioxide lean water stream removed as a bottoms product of the first fractionation column into the absorption zone as the sulfur dioxide lean absorbent stream;

(d) removing a first liquid sidecut stream comprising sulfur dioxide from the first fractionation column at a second, higher intermediate point;

(e) partially condensing an overhead vapor stream comprising sulfur dioxide and carbon dioxide withdrawn from the first fractionation column to form a first condensate stream comprising sulfur dioxide and a first vapor stream comprising carbon dioxide and sulfur dioxide;

(f) admixing the first vapor stream with a hereinafter described second vapor stream and partially condensing the resultant admixture to form a third vapor stream comprising sulfur dioxide and carbon dioxide and a second condensate stream comprising sulfur dioxide;

(g) passing the first and the second condensate streams into the first fractionation column as reflux liquid;

(h) passing the third vapor stream into the absorption zone and contacting the third vapor stream with the sulfur dioxide lean absorbent stream;

(i) passing the first liquid sidecut stream into a first intermediate point of a second fractionation column having a rectification section and a stripping section and operated at conditions effective to cause the separation of water and sulfur dioxide by fractionation including the retention of liquid sulfur dioxide on fractionation trays located above the first intermediate point;

(j) removing a second liquid sidecut stream comprising anhydrous sulfur dioxide from the second fractionation column at a second, higher intermediate point;

(k) passing a bottoms liquid product stream comprising water and sulfur dioxide and removed as a bottoms product of the second fractionation column into the first fractionation column;

(l) partially condensing an overhead vapor stream comprising sulfur dioxide and carbon dioxide and removed from the second fractionation column to form reflux liquid returned to the second fractionation column and a fourth vapor stream comprising sulfur dioxide and carbon dioxide; and, (m) admixing the fourth vapor stream with the first vapor stream as the previously specified second vapor stream.

2. The process of claim 1 further characterized in that the third vapor stream is admixed into the gaseous feed stream to effect contacting with the sulfur dioxide lean absorbent stream.

3. The process of claim 1 further characterized in that the second liquid sidecut stream comprises 99.9 mol. % sulfur dioxide.

4. The process of claim 1 further characterized in that the bottom temperature maintained within the first fractionation column is within 10 Fahrenheit degrees of the boiling point of water at the pressure imposed.

5. The process of claim 3 further characterized in that the bottom temperature maintained within the first fractionation column is within 5 Fahrenheit degrees of the boiling point of water at the pressure imposed.

6. A process for removing sulfur dioxide from an aqueous stream comprising sulfur dioxide and carbon dioxide which comprises the steps of:

(a) passing a liquid feed stream comprising water, carbon dioxide and sulfur dioxide into a first intermediate point of a first fractionation zone having a rectification section and a stripping section and operated at conditions effective to cause the separation of water and sulfur dioxide by fractionation including (1) a bottom temperature within 20 Fahrenheit degrees of the boiling point of water at the pressure imposed at the bottom of the first fractionation zone, and (2) the retention of liquid sulfur dioxide on fractionation trays located above the first intermediate point and the retention of liquid water on fractionation trays located below the first intermediate point;

(b) removing a lean water stream from the first fractionation zone as a bottoms product;

(c) removing a first liquid sidecut stream comprising sulfur dioxide from the first fractionation zone at a second, higher intermediate point;

(d) partially condensing an overhead vapor stream comprising sulfur dioxide and carbon dioxide which is withdrawn from the first fractionation zone to form a first condensate stream comprising sulfur dioxide and a first vapor stream comprising carbon dioxide and sulfur dioxide;

(e) admixing the first vapor stream with a hereinafter described second vapor stream and partially condensing the resultant admixture to form a third vapor stream comprising sulfur dioxide and carbon dioxide and a second condensate stream comprising sulfur dioxide;

(f) passing the first and the second condensate streams into the first fractionation zone as reflux liquid;

(g) passing the first liquid sidecut stream into a first intermediate point of a second fractionation zone having a rectification section and a stripping section and operated at conditions effective to cause the separation of water and sulfur dioxide by fractionation including the retention of liquid sulfur dioxide on fractionation trays located above the first intermediate point;

(h) removing a second liquid sidecut stream comprising anhydrous sulfur dioxide from the second fractionation zone at a second, higher intermediate point;

(i) passing a bottoms liquid product stream comprising water and sulfur dioxide removed as a bottoms product of the second fractionation zone into the first fractionation zone;

(j) partially condensing an overhead vapor stream comprising sulfur dioxide and carbon dioxide and removed from the second fractionation zone to form reflux liquid returned to the second fractionation zone and a fourth vapor stream comprising sulfur dioxide and carbon dioxide; and, (k) admixing the fourth vapor stream with the first stream as the previously specified second vapor stream.

7. The process of claim 6 further characterized in that the second liquid stream comprises at least 99.9 mol.% sulfur dioxide.

8. The process of claim 6 further characterized in that the bottom temperature maintained within the first fractionation zone is within 10 Fahrenheit degrees of the boiling point of water at the pressure imposed.

9. The process of claim 8 further characterized in that the reflux liquid passed into the first fractionation zone contains over 95 mol.% sulfur dioxide.

10. The process of claim 6 further characterized in that the first and the second fractionation zones each comprise a single fractionation column.

* * * * *